April 12, 1966  N. MUELLER  3,245,295
PROCESS OF CUTTING PLURAL GARMENT COMPONENTS FROM FABRIC
Filed July 17, 1962  3 Sheets-Sheet 1

Inventor:
NICOLAUS MUELLER
By Robert W. Beach
ATTY

April 12, 1966  N. MUELLER  3,245,295

PROCESS OF CUTTING PLURAL GARMENT COMPONENTS FROM FABRIC

Filed July 17, 1962  3 Sheets-Sheet 2

Inventor:
NICOLAUS MUELLER
By Robert W. Beach
ATTY

April 12, 1966 N. MUELLER 3,245,295
PROCESS OF CUTTING PLURAL GARMENT COMPONENTS FROM FABRIC
Filed July 17, 1962 3 Sheets-Sheet 3

Inventor:
NICOLAUS MUELLER

By Robert W. Bead
ATTY

United States Patent Office
3,245,295
Patented Apr. 12, 1966

3,245,295
PROCESS OF CUTTING PLURAL GARMENT
COMPONENTS FROM FABRIC
Nicolaus Mueller, Auf der Weismark 2a,
Trier, Germany
Filed July 17, 1962, Ser. No. 210,464
Claims priority, application Germany, July 19, 1961,
M 49,735
6 Claims. (Cl. 83—56)

This invention relates to a process and a device for cutting textile fabrics, especially clothing material, to be used for manufacturing suits, coats and the like.

It is known in the art to make clothing articles by cutting the material taken from a bolt of cloth first and sewing afterwards. In case of individual manufacture, as is still cutomary in smaller tailor-workshops, the cutting line is drawn upon the fabric and then the material is cut accordingly by hand with a pair of scissors. This traditional proceeding required, however, a comparatively long time for cutting. Therefore, the clothing industry, where many articles of the same size and sort are manufactured, proceeds to pile up many breadths of cloth one upon another, to draw or chalk the cut upon the uppermost breadth and to cut all the breadths lying one upon another simultaneously by means of a knife-like cutting tool.

It is true that the capacity of cutting thereby is considerably increased, since several clothing articles can be cut at the same time. A disadvantage, however, is that considerable preparation time is needed for piling up the individual breadths and for separating the cut pieces. Even with a cutting tool of very high capacity it is scarcely possible to shorten manufacturing time as long as the preparation time cannot be reduced.

Besides, simultaneous cutting of multiple breadths, in comparison with cutting an individual breadth, has the considerable disadvantage that the producer is very much restricted in his deliveries. Sometimes the orders cannot be delivered as quickly as wanted, since very often a long time elapses, especially when extraordinary sizes are required, until a sufficient number is accumulated to make multiple cutting profitable.

Furthermore, always a certain percentage of individual cuts must be made daily, but the proportion of individual cuts to multi-cuts of breadths changes. Consequently, a continuous consistent predictable working schedule is nearly impossible, since the time needed for every cut changes according to the number of breadths, while on the whole the time needed for sewing is the same for every article.

It is my invention to propose a proceeding for cutting textile fabrics, preferably for the manufacture of clothing articles, by individual cut which is characterized by rearranging the components of the patterns so as to have an uninterrupted cutting line and by cutting the individual fabric pieces according to such continuous cutting line. This is done automatically.

Further reduction of work can be achieved by combining the pieces of several articles of clothing in one pattern having an uninterrupted cutting line and cutting them correspondingly. It is also possible to divide the pattern by several uninterrupted cutting lines which are approximately parallel to each other and to cut the breadth longitudinally according to these cutting lines with several cutting tools at one time. It is advantageous to detect, read or trace the drawn pattern by mechanical, electrical, photoelectrical or electro-magnetic means. The pattern is then transmitted to the cutting tool.

For performing the process a device is used comprising a cutting table with a slip-proof table plate and a cutting tool which is mechanically guided above the table plate and displaceable vertically.

The table plate is perforated in one preferred example and under the table plate vacuum means is placed in order to hold firmly by suction the breadth lying on the table.

The cutting tool can be guided in a manner similar to a pantograph by lever bars. It has proved to be most advantageous to mount the cutting tool on a carriage running over the table both in longitudinal and transverse directions and to provide at the end of the guiding rod of the cutting tool a counter-knife, i.e. a fixed shearing blade.

To effect vertical movement of the cutting tool a magnetic lifter, the lifting height of which can be varied, is provided on the carriage. The cutting tool above the fabric and the counter-knife beneath the fabric are mounted for rotation through 360° in order to follow the pattern in every traced direction.

It is most advantageous to use a cutting tool formed like a needle which extends downward and it is also possible to use a heated needle for cutting purposes.

The counter-knife is connected with a convex jaw which makes it possible to lift the fabric somewhat off the table plate.

Further details of the invention can be seen from the preferred sample shown in the annexed drawing.

Figure 1:
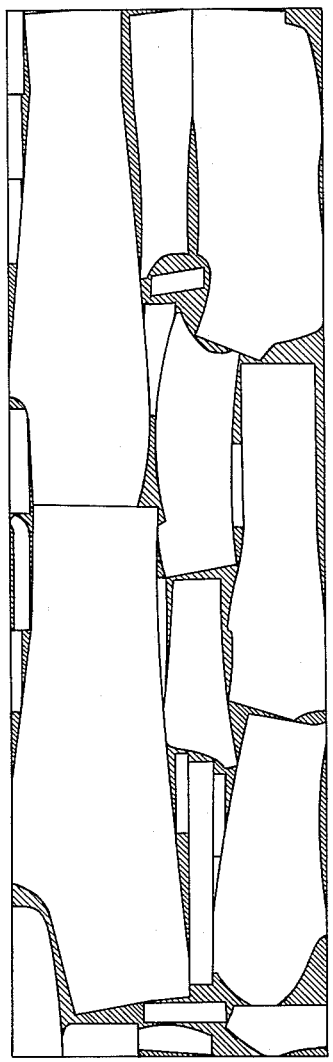
FIGURE 1 shows a pattern as used for cutting of lounge-suits.

For performing the cutting process for textile fabrics according to the invention it is at first necessary to change a known pattern, as for example shown in FIGURE 1, so that the whole pattern consists of one uninterrupted cutting line. This can be seen from FIGURE 2. The cutting line begins with point $x$ and follows the direction of the arrows. Thus all cloth pieces which are needed for tailoring are cut as shown in the pattern of FIGURE 1, only in some places the cloth pieces still hang together by a few threads which can be easily cut by hand. According to the example of FIGURE 2 the breadth is cut longitudinally at six locations, the cutting tool running three times transversely of the breadth.

Figure 2:
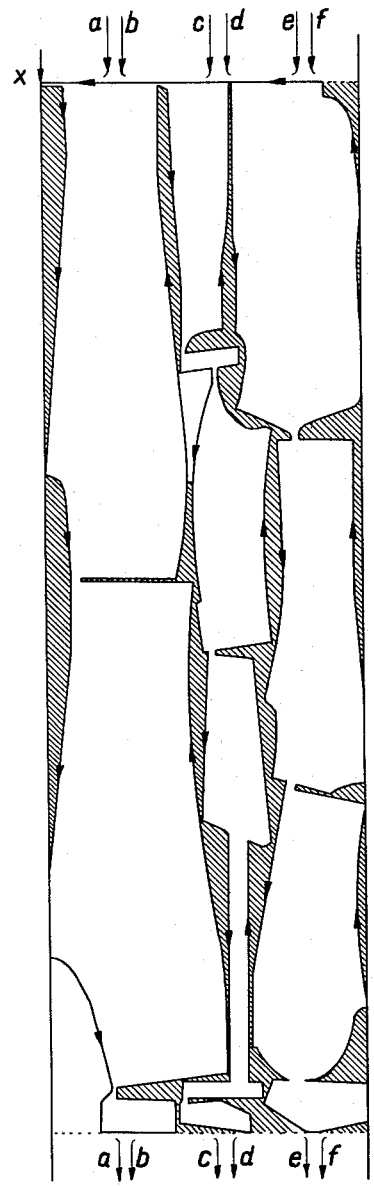
FIGURE 2 shows the pattern according to FIGURE 1 reduced, however, to an uninterrupted cutting line.
Figure 3:
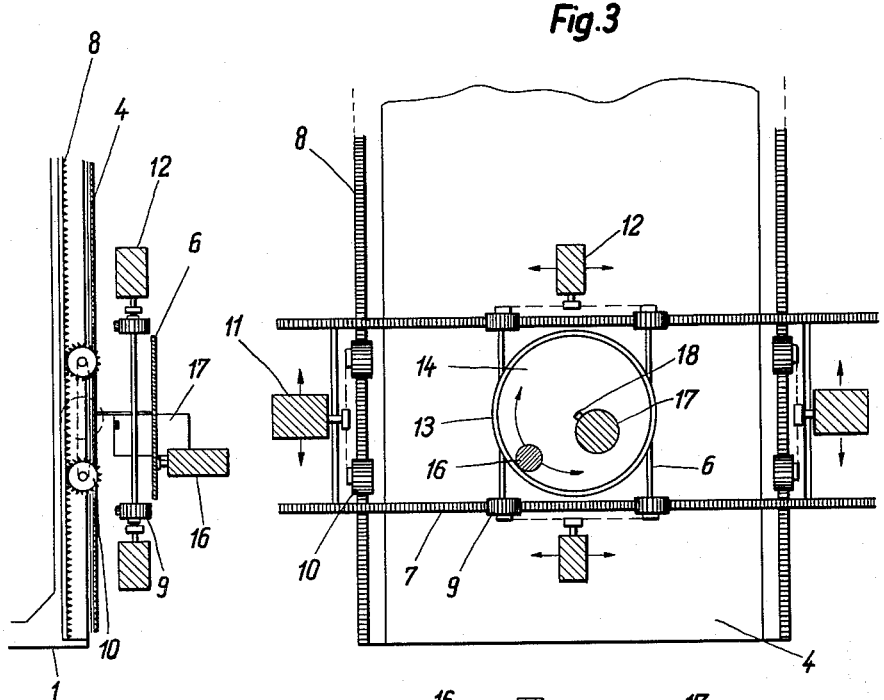
FIGURE 3 is a plan of the inventive cutting device.
Figures 4, 5:
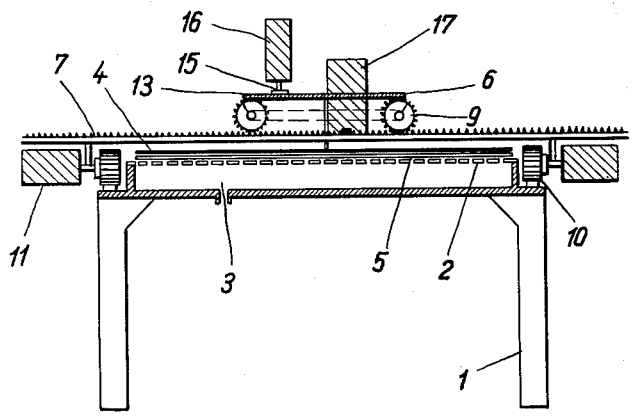
FIGURE 4 is a front elevation of the device according to FIGURE 3.
FIGURE 5 is a side elevation of the device.
Figure 6:
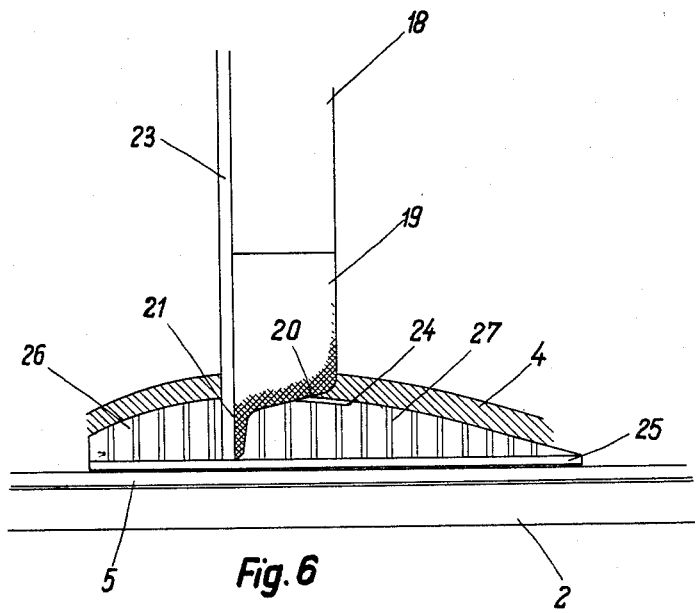
FIGURE 6 is a fragmentary elevation of the cutting tool on an enlarged scale.

Moreover it is indicated in the pattern of FIGURE 2 that the pattern can be cut by several cutting tools. According to the sample shown in FIGURE 2, six cutting tools can be applied. In this case the six cutting tools $a$, $b$, $c$, $d$, $e$, $f$ run approximately parallel along the breadth of cloth. It is not necessary then to turn the cutting direction.

Of course it is also conceivable to combine the individual parts for several articles of clothing in one uniform pattern and to cut it with one or several cutting tools.

The pattern shown in FIGURE 2 can be made, for example, by an adequately shaped matrix, comprising grooves according to the wanted pattern. By means of tracing mechanism the pattern can be detected and transferred to the cutting tool by means of a lever or pantograph.

It is also possible to use electronics for tracing purposes. The pattern can especially be read by means of coordinates which are recorded either by tape, magnetic drum, core, relay or perforated strip. The recorded coordinates can be used at any time when the definite pattern is to be cut.

As an alternative to mechanical tracing, a photoelectric cell can be used. The prescribed cutting line is traced on a model and the coordinates are transmitted either directly to the cutting tool or to recording means.

It is most advantageous to draw the pattern contour with magnetic China ink and then to trace it electromagnetically.

In all described electrically steered operations the cutting tool receives the signals electrically. Several cutting means may be controlled by one central recording system. It is most advantageous to use a photoelectric or an electro-magnetic control because the performance of cutting can be optically seen. Thus the pattern on the model and the pattern on the breadth can be compared and controlled.

Cutting is performed by means according to FIGURES 3–6.

A cutting table 1 comprises a table plate 2. This plate is perforated. A suction device is arranged beneath plate 2 and holds the fabric tightly on the plate. If a model 5 is used which is disposed under fabric 4, this model must be perforated too. Otherwise no suction is produced on the upper side of the model. Both fabric and model are held on the table by suction. Above table 1 a carriage 6 is arranged running on two parallel rails 7. Under the rails 7 two parallel rails 8 are furnished perpendicular to rails 7. The rails 7 and 8 may be shaped like racks. The carriage 6 is provided with rollers 9 running along the rails 7. Rails 7 are supported on rollers 10 running along rails 8. Carriage 6 can be displaced either longitudinally or transversely. Longitudinal displacement is effected by motors 11 and transverse displacement by motors 12.

On carriage 6 an outer ring 13 is mounted including an inner gear ring. Within ring 13 a disc 14 is rotatably mounted. A pinion 15 rotated by motor 16 meshes with gear ring 13 and causes rotation of disc 14. The motor 16 is fixedly mounted on disc 14. Disc 14 is provided with a vertically movable magnetic lifter 17 controlling the cutting movements of cutting tool 18.

The cutting tool 18 comprises a reciprocating knife 19. The cutting edge 20 has a needle-like extension 21 on one side. Cutting edge 20 is used for straight cuts. Extension 21 is used to make curved cuts. The cutting tool 18 is so connected to the magnetic lifter 17 as to be received in the central portion of disc 14 so as to provide effective rotation of the cutting tool.

As stated previously, the magnetic lifter 17 effects vertical movement of the reciprocating knife 19 up and down. During this movement the knife 19 is received in a guide groove of bar 23. At the lower end of guide bar 23 is a counter-knife or fixed blade 24. During cutting this knife is located between the fabric and the table. The counter-knife 24 cooperates with cutting edge 20 or extension 21, respectively, to effect a shearing cut.

The counter-knife may be mounted on a plate 25 sliding along table 2. On plate 25 and near the counterknife 24 a convex jaw 26 is provided for lifting the fabric to be cut so that a precise cut can be obtained without the reciprocating knife 19 touching the table plate. Jaw 26 and counter-knife 24 are connected to the carriage. The counter-knife is connected to the carriage by means of the guiding bar 23 so that cutting tool 18 and counter-knife 24 can be guided over table 1 conjointly. The jaw can be shifted relatively to the cutting tools 18 and 24 to lift the fabric to a desired degree. If straight parts are to be cut, the fabric is lifted to a greater extent than if curved lines are to be cut. The degree of lifting determines whether the fabric is cut by the whole reciprocating knife 19 or only by extension 21.

It is also possible to connect jaw 26 and counter-knife 24 and to control the stroke of reciprocating knife 19 by lifter 17 in order to cut to different depths. Long cutting strokes for straight lines and short cutting strokes for curved lines are desired. This results in cutting either by the entire length of the reciprocating knife blade or only by the needle-like extension.

In order to obtain suction in the area of the jaw the plate 25 and the jaw 26 are provided with air passages 27.

Figure 7:
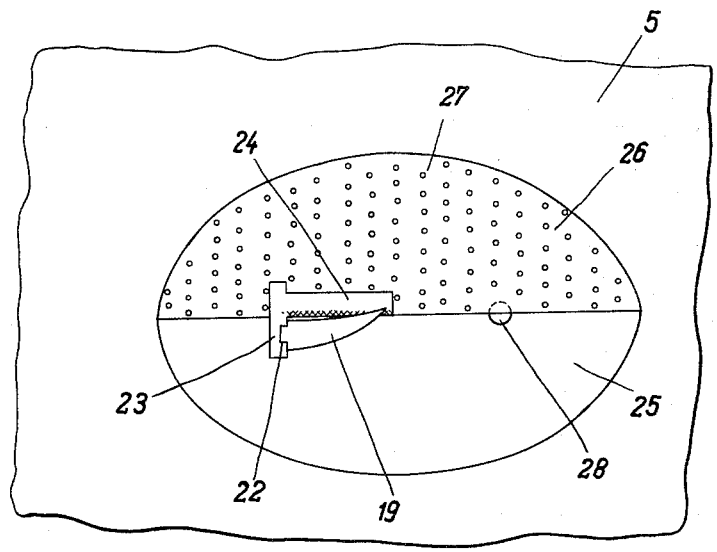
FIGURE 7 is a plan of the cutting tool without fabric.

The cutting process may be effected by locating a model 5 directly beneath fabric 4 and tracing the pattern with the cutting tool. In this case plate 25 is provided with electro-magnetic or photoelectric tracing members which are located adjacent to the counter-knife 24 either in front of it or at its side. This arrangement is diagrammatically shown in FIGURE 7 in the form of a light-spot 28 which is guided along the cutting line of model 5.

The inventive process for cutting fabric for clothing articles is performed as follows:

Fabric taken from a bolt is put on table 1. The fabric 4 is held on the table by suction device 3. The fabric can thus not be moved about the table. Carriage 6 is driven along the breadth of fabric 4 until cutting tool 18 is positioned above point x of the pattern (FIGURE 2). Motors 11 and 12 adapted to effect forward movement of the carriage, motor 16 adapted to effect rotative movement of the cutting tool and lifter 17 adapted to effect vertical cutting movement of the reciprocating knife 18 are put into action. Thereupon carriage 6 is shifted and cutting tool 18 is driven along the cutting line. The track of the cutting tool 18 is controlled by controlling mechanism which is not shown on the drawings. The cutting direction is indicated by arrows in FIGURE 2. At the same time the counter-knife 24 and the convex jaw 26 are displaced beneath the fabric to coact with the cutting tool 18.

After the cut has been completed the fabric is drawn forward to provide new material for another cut. The cut parts are separated if necessary and conveyed to the sewing plant.

By means of the inventive process and the new device for working this process it is possible to attain a continuous manufacturing of cut parts and the time and personnel required are substantially reduced. Furthermore labor can be used which is not experienced in the art. The whole organization of the cutting plants can be simplified and the working time for one manufacturing order can be shortened. The cost for individual orders will be comparable to that of quantity orders since single and multiple cuts are no longer calculated in different ways.

What is claimed is:

1. The process of cutting textile fabrics for manufacturing garments which comprises providing a pattern composed of a plurality of garment components arranged in generally coplanar edge-to-edge relationship and having portions defined by a single uninterrupted predetermined cutting line extending from one garment component to the next adjacent component throughout the length of the pattern, and automatically cutting progressively along such predetermined cutting line continuously throughout the length of the pattern and thereby producing a plurality of components corresponding to such cutting line.

2. The process of cutting textile fabrics for manufacturing garments which comprises providing a pattern composed of a plurality of garment components arranged in generally coplanar edge-to-edge relationship and defined by a plurality of generally parallel nonintersecting uninterrupted predetermined cutting lines extending from one garment component to the next adjacent component throughout the length of the pattern, and automatically cutting progressively along such predetermined cutting lines continuously throughout the length of the pattern and thereby producing a plurality of components corresponding to such cutting lines.

3. The process of cutting textiles fabrics for manufacturing garments which comprises providing a pattern composed of a plurality of elongated garment components arranged in generally parallel coplanar edge-to-edge relationship and defined by a plurality of generally parallel nonintersecting uninterrupted predetermined cutting lines extending from one garment component to the next adjacent component throughout the length of the pattern, and automatically cutting progressively along such predetermined cutting lines continuously throughout the length of the pattern and thereby producing a plurality of components corresponding to such cutting lines, cutting out only one type of garment component at a time but several layers deep.

4. The process of cutting textile fabrics for manufacturing garments which comprises providing a pattern composed of a plurality of components of different garments arranged in generally coplanar edge-to-edge relationship and having portions defined by a single uninterrupted predetermined cutting line extending from one garment component to the next adjacent component throughout the length of the pattern, and automatically cutting progressively along such predetermined cutting line continuously throughout the length of the pattern and thereby producing a plurality of components corresponding to such cutting line.

5. The process of cutting textile fabrics for manufacturing garments which comprises providing a pattern composed of a plurality of garment components arranged in generally coplanar edge-to-edge relationship and defined by a plurality of generally palallel nonintersecting uninterrupted predetermined cutting lines extending from one garment component to the next adjacent component throughout the length of the pattern, and automatically moving simultaneously a plurality of cutting tools progressively along such plurality of predetermined cutting lines continuously throughout the length of the pattern and thereby cutting the plurality of components along such cutting lines.

6. The process of cutting textile fabrics for manufacturing garments which comprises providing a pattern composed of a plurality of garment components arranged in generally coplanar edge-to-edge relationship and having portions defined by a single uninterruped predetermined cutting line extending from one garment component to the next adjacent component throughout the length of the pattern, automatically tracing such predetermined cutting line, and automatically cutting progressively along a line corresponding to such predetermined cutting line continuously throughout the length of the pattern and thereby producing a plurality of components corresponding to such cutting line.

References Cited by the Examiner

UNITED STATES PATENTS

| | | | |
|---|---|---|---|
| 245,149 | 8/1881 | Fowler | 83—565 |
| 1,382,931 | 6/1921 | Prevost | 144—326 |
| 1,539,932 | 6/1925 | Booth | 144—326 |
| 1,543,203 | 6/1925 | Braren | 83—565 |
| 1,546,934 | 7/1925 | Levin | 83—565 |
| 1,612,971 | 1/1927 | Freeburg | 83—71 |
| 2,172,313 | 9/1939 | Young | 83—565 |
| 2,217,060 | 10/1940 | Korsen | 83—55 |
| 2,317,348 | 4/1943 | Wekeman | 269—21 |
| 2,717,979 | 9/1955 | Gardiner | 90—13.4 |
| 2,736,349 | 2/1956 | Francis | 143—26.2 |
| 2,742,964 | 4/1956 | Levin | 30—273 |
| 2,844,203 | 7/1958 | Bosel et al. | 83—170 |
| 2,958,247 | 11/1960 | Levine | 83—71 |
| 2,966,086 | 12/1960 | Sjostrom | 83—206 |
| 2,991,663 | 7/1961 | McHugh | 90—13.4 |
| 3,002,115 | 9/1961 | Johnson et al. | 90—13.99 |
| 3,094,031 | 6/1963 | Reeber et al. | 83—575 |
| 3,105,907 | 10/1963 | Colten et al. | 250—202 |

FOREIGN PATENTS 859,526    1/1961    Great Britain.

ANDREW R. JUHASZ, *Primary Examiner.*

HUNTER C. BOURNE, JR., LEON PEAR, *Examiners.*